Sept. 7, 1926.

G. S. DEY 1,598,605

OPTICAL TEST CHART

Filed August 21, 1924       2 Sheets-Sheet 1

INVENTOR.
Gilbert S. Dey
BY
Stockbridge & Borst
ATTORNEYS.

Sept. 7, 1926.  1,598,605
G. S. DEY
OPTICAL TEST CHART
Filed August 21, 1924    2 Sheets-Sheet 2
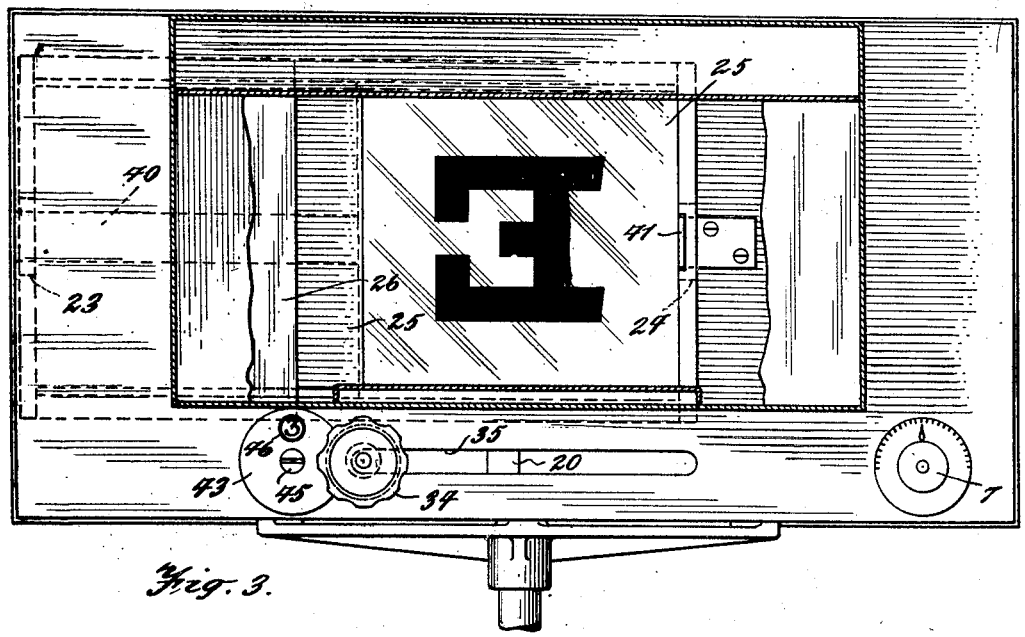
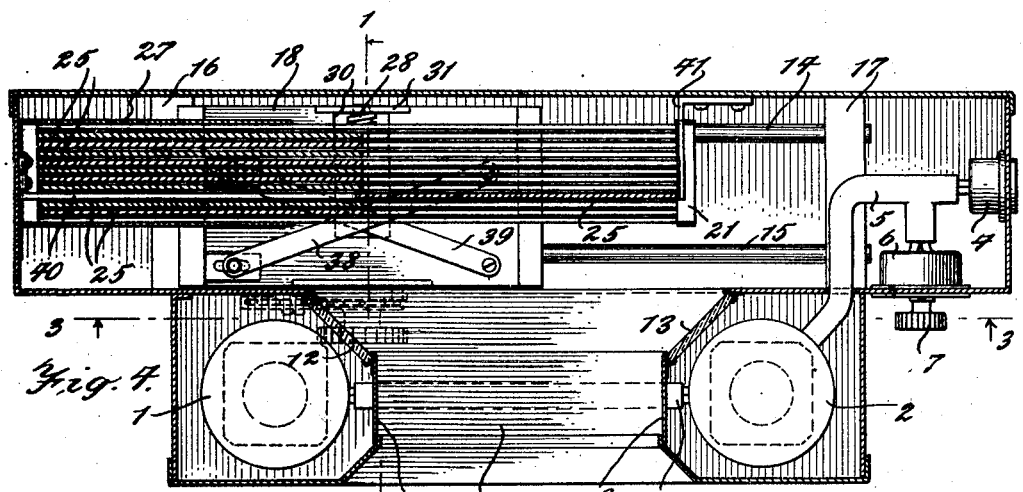
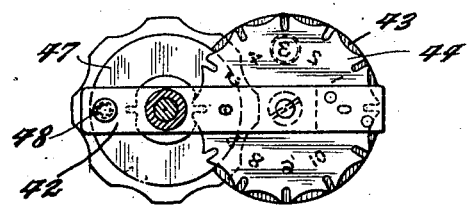
INVENTOR.
Gilbert S. Dey
BY
Stockbridge & Borst
ATTORNEYS.

Patented Sept. 7, 1926.

1,598,605

UNITED STATES PATENT OFFICE.

GILBERT S. DEY, OF MOUNT VERNON, NEW YORK, ASSIGNOR TO GENERAL OPTICAL COMPANY, INC., A CORPORATION OF NEW YORK.

OPTICAL TEST CHART.

Application filed August 21, 1924. Serial No. 733,248.

This invention relates to optical test charts used by optometrists in making tests of the visual acuity of patients, and more particularly to charts of the type described and claimed in my copending application Serial No. 733,247, filed August 21, 1924, which are designed to obtain a central fixation on the part of the patient during the examination. Such charts have a comparatively small recessed opening, through which one set of characters are seen at a time, each set preferably appearing at exactly the same place and in the same vertical plane. In the construction shown in my said copending application, the charts are mounted on a carriage within the casing so as to be moved successively into and out of observation position, the carriage being moved toward or from the observation opening a distance equal to that between the charts for each shifting movement of the chart. In this way the plane of observation is the same for all the charts. It is necessary with such a construction, however, to shift the charts in succession and hence if the operator desires to exhibit a chart other than one immediately adjacent to the chart already in the plane of observation, it is necessary for him to operate all of the intermediate charts.

An object of this invention is to provide a construction in which the charts may be exposed for observation selectively, thereby enabling the operator to display any desired chart however removed in sequence it be from the chart which happens to be in the plane of observation.

Another object is to provide an indicating device conveniently located on the device and operative in conjunction with the chart selecting mechanism which will indicate to the operator at all times the chart which is brought into view when the chart shifting mechanism is operated. Other objects are simplicity of construction, and facility, convenience and reliability of operation. Still other objects and advantages of my invention will appear from the following description.

In the chart construction of my said copending application, the mechanism which operates to bring the charts successively into the plane of observation is also operatively connected with the chart shifting mechanism so that the two are operated in conjunction. This results in the shifting of the charts successively as they are successively moved through the plane of observation. In accordance with this invention I disassociate the two mechanisms which operate, one to advance and retract the charts, and the other to shift them into and out of the plane of observation. This enables me to advance or retract the chart holders any desired distance before operating the chart shifting means.

While various forms of mechanism for shifting the charts will readily suggest themselves, I have selected for the purpose of illustration, a construction in which the charts are mounted in parallel grooves and are slidable back and forth and engage a push member which serves to restrain the particular chart engaged by it and thus hold it exposed before the observation opening. The relative position of the chart mount and the push member determines which chart will be held exposed before the opening, and this relative position may be selectively determined by relative movement of the pusher and chart mount toward and from the front of the casing. The number of the chart in engaging relation to the push member may be indicated by a number wheel or other equivalent device, conveniently located for the observation of the operator and operated in conjunction with the mechanism for relatively advancing and retracting the chart mount and push member. My invention includes various other features of construction and arrangements and details of parts, as will hereinafter more fully appear. I shall now describe the illustrated embodiment of my invention and shall thereafter point out my invention in claims.

Fig. 3 is a front elevation with the lamp compartment in section just back of the lamp sockets and part of the rear wall of the lamp compartment broken away;

Fig. 4 is a horizontal section;

Fig. 5 is a detail of the inner face of the counter mechanism, this view being a section on the line 5—5 of Figure 1;

Fig. 6 is an enlarged sectional detail of the frictional stop for the counter mechanism.

Figure 1:
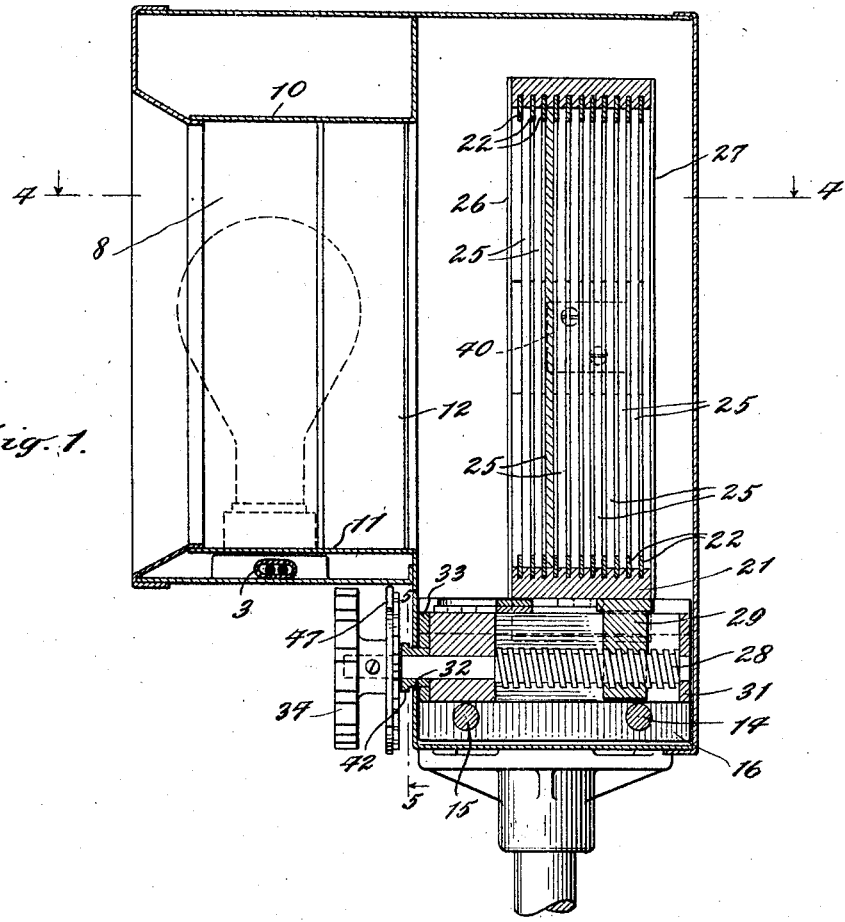
Fig. 1 is a transverse sectional elevation of a chart mechanism embodying my invention, the section being taken on the line 1—1 of Figure 4.
Figure 2:
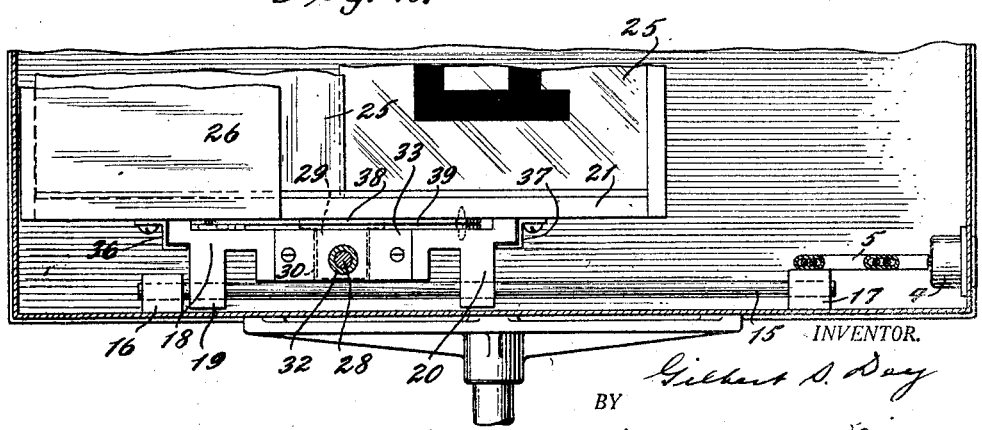
Fig. 2 is a longitudinal sectional elevation of the lower part of the device taken on line 2—2 of Figure 1.

The housing for the mechanism shown has an oblong casing of sheet metal or other suitable material having a main compartment in which the charts and the operating mechanism therefor are contained and a reduced extension on its front face forming a lamp compartment. This lamp compartment has its top wall continuous with that of the main compartment, while its two end walls and its bottom wall are set in substantially from the corresponding walls of the main compartment. In each end of the lamp compartment is a lamp housing, the lamps 1 and 2 being shown in sockets on the bottom walls of these lamp chambers, while a conduit 3 on the bottom wall of the lamp compartment encloses the wires connecting the two lamp sockets. An outlet plug 4 is provided in the right end wall of the main compartment, and the wires from this plug to the lamps pass through a conduit 5, first going through a rheostat 6 on the front wall to the main compartment at the right of the lamp compartment. The operating knob 7 for the rheostat is on the outer face of this front wall. The lamp compartment has a central rectangular observation opening, the side walls of which are formed by the side plates 8 and 9 of the lamp housing, and the top and bottom of which are formed by the plates 10 and 11. The walls of this passage at its outer end are shown as flared outwardly, and diffusing glass screens 12 and 13 are held obliquely in the inner corners in channels along the inner edges of the side plates 8 and 9 and in corresponding channels in the edges of an opening in the front wall of the main compartment registering with the opening 11. The interior of the main compartment is thus exposed through the observation opening, and a chart back of this opening in the main compartment will be illuminated by diffused light from the two lamps.

Along the bottom of the main compartment parallel to the plane of the observation opening run two guide rods 14 and 15 which are secured at their ends in blocks 16 and 17 secured to the bottom of the casing. A carriage 18 is mounted to reciprocate on these guide rods 14 and 15, having two legs 19 and 20, each provided with two holes of the proper size and disposition to receive the rods.

On this carriage is a chart mount 21, which is mounted for transverse adjustment toward and from the observation opening relative to the carriage, but is moved laterally with the carriage as the carriage is reciprocated. This chart mount is in an elongated rectangular frame having metal strips 22 in its top and bottom which provide closely spaced longitudinal grooves in which the charts are free to slide. The end walls of the chart mount are closed, except for a short distance, substantially midway of their height, where openings 23 and 24 are provided, as indicated by the dotted lines in Fig. 3. The charts 25 are disposed in the grooves between the metal strips 22. The chart mount 21 has retaining plates 26 and 27 on its front and rear faces on the left end thereof. These plates are somewhat shorter than are the charts 25, and the charts are slightly more than half the length of the grooves in the mount, so that the rear edge of an exposed chart overlaps somewhat the front edges of the charts in non-exposed position.

In the construction shown, as above indicated, the chart mount is made to move forward and back to bring the charts selectively into engaging relation with the chart shifting member, and to effect this movement, a feed screw 28 is employed, which coacts with a T-shaped nut 29 on the under side of the mount 21. The head of this nut 29 is secured on the bottom of the chart mount and the nut itself slides in a recess 30 formed in the carriage 18, and extending normal to the plane of the observation opening. The feed screw 28 bears at its rear end in a metal plate 31 on the rear face of the carriage, which serves to close the recess 30, and its front end beyond the screw threaded portion passes through a bore in the front wall of the carriage 18 and protrudes through the front of the casing, a bushing 32 in a metal plate 33 on the front face of the carriage serving as the front bearing for the feed screw. A hand knob 34 on the protruding end of the feed screw provides for its manual operation, while a slot 35 in the front wall of the casing permits of the reciprocation of the protruding end of the feed screw to reciprocate the carriage.

The angular movement of the knob 34 serves to feed the chart mount back and forth on the carriage. The mount is guided in this movement by two angle plates 36 and 37 secured on the under face of the mount and fitting under transverse shoulders on the ends of the carriage and also by crossed links 38 and 39 which connect the lower face of the mount to the top face of the carriage, one end of each link being connected to the carriage and the other end to the mount. One end of each link has a slotted connection, as shown, to accommodate its movement.

On the left wall of the casing is a push member 40, which is shown as a sheet metal arm with a flanged foot riveted to the side wall. This arm is disposed in line with the opening 23 in the adjacent end of the mount, and extends in a plane parallel with the planes of the charts and terminates at its inner end substantially in line with the left side of the observation opening. The push member is slightly shorter than the charts, the combined length of the push member and a chart being substantially the same as the length of the guide grooves for the charts. The push member 40 is in the plane of observation.

Secured to the rear wall of the casing is a stop member 41 which extends forwardly parallel to the side walls with its forward end in line with the push member 40. This stop member 41 is also a sheet metal arm and extends within the space between the ends of the chart mount, being so disposed that it is received within a groove provided for the purpose in the inner edge of the right end member of the mount 21, the parts being so disposed that the stop member lies flush in this groove when the carriage and chart mount are in their extreme position toward the left. In order to assemble the parts, the rear wall which carries this stop member 41 is made removable.

The pitch of the threads on the feed screw 28 is such that the mount is moved the distance between the centers of two adjacent grooves as the feed screw is turned angularly 180°. The indicating device, which will identify to the operator the chart in the plane of observation, is mounted on the front of the casing and is actuated by the protruding end of the feed screw shaft. In the construction shown a flat metal bar 42 is integral with the bushing 32 and extends horizontally along the front of the casing. A bearing disc 43 for the number wheel 44 has a radially extending arm which is folded behind the disc and secured by rivets to the left end of the bar 42. The number wheel 44 turns on a stud 45 passing centrally through the number wheel and secured at its ends in the bar 42 and in the disc 43. The disc 43 has an opening 46, through which the numbers on the number wheel are exposed. This number wheel constitutes the driven member of a Geneva transfer, the driving member 47 of which is fixed on the shaft of the feed screw 28 and has two actuating pins 180° apart in the plane of the number wheel 44. The number wheel will therefore be moved one step for each angular movement of 180° of the feed screw. The numbers on the number wheel are so spaced as to come successively into register with the opening 46 with the successive steps of movement of the Geneva transfer, and these numbers will correspond with the succesive numbers of the charts. As the frictional means for holding the indicating mechanism in its adjusted positions, a frictional stop member 48 is provided which consists of a spring pressed plunger, the spring containing cylinder of which is secured to the bar 42, the plunger snapping successively into two diametrically opposed recesses in the inner face of the member 47.

In the illustrated position of the parts, the chart number 3 is exposed. To shift to any other chart, the operator will grasp the knob 34 and slide the carriage and the chart mount to the right. The stop member 41 will hold the exposed chart from further movement to the right, and all the charts will, therefore, be in register with the observation opening when the carriage is in its extreme position to the right. This will bring the rear end of all of the charts clear of the push member 40, and the chart mount will, therefore, be free to be adjusted forwardly or backwardly to bring any desired chart into engaging relation with the push member 40. This latter adjustment is effected by the turning of the hand knob 34, the number wheel 44 being actuated simultaneously so as to indicate to the operator what chart is in the plane of observation. When this number wheel indicates that the desired chart is in this plane, he moves the carriage back to its extreme left position, the push member, meanwhile, holding the chart indicated by the number wheel in exposed position, while the other charts are carried back with the mount.

It is obvious that various modifications in the details and arrangement of parts herein described and illustrated for the purpose of explaining the nature of my invention, may be made by those skilled in the art within the principle and scope of the invention.

I claim:

1. An optical chart mechanism comprising a casing having an observation opening in its front wall, a plurality of charts mounted within the casing and movable into and out of observation position before the opening, operating means effective upon said charts to cause their individual segregation in said observation position, and means for bringing the charts and operating means into relative relations enabling individual segregation of the charts in any desired sequence.

2. An optical chart mechanism comprising a casing having an observation opening in its front wall, a chart mount movable toward and away from the opening, a plurality of charts carried by the mount in vertical planes one behind another, fixed operating means within the casing and operative upon said charts to cause their individual segregation within said observation position, and means for bringing the charts selectively into operative relation with the operating means, enabling individual segregation of the charts in any desired sequence.

3. An optical chart mechanism comprising a casing having an observation opening in its front wall, a chart mount within the casing, a plurality of charts in the mount movable into and out of observation position before the opening, manually operative chart shifting means operative to cause segregation of the charts individually on said mount and in said observation position, the said mount and shifting means being relatively movable toward and away from the opening to bring the charts selectively into operative relation to the shifting means, and manual means for effecting said relative movement operative independently of the shifting means.

4. An optical chart mechanism comprising a casing having an observation opening in its front wall, a chart mount within the casing movable toward and away from the observation position, a plurality of charts in the mount movable into and out of observation position before the opening, fixed chart shifting means within the casing operative to cause segregation of the charts individually on said mount and in said observation position upon one movement of said mount, manual means for operating the mount to cause such segregation, and manual means for translating the chart mount to bring the charts selectively into operative relation to the shifting means and thereby determine the chart to be segregated, the two manual means operating independently of each other.

5. An optical chart mechanism comprising a casing having an observation opening in its front wall, a carriage mounted to reciprocate laterally within the casing, a chart mount on the carriage movable therewith, a plurality of charts in the mount movable thereon to and from observation position, an operating member carried by the casing in position to engage the charts as the carriage is moved laterally and operative thereby to segregate a chart with which it cooperates from the others in said observation position, and means for bringing the individual charts and operating member selectively into operative relation, whereby the charts may be segregated individually in any desired sequence.

6. An optical chart mechanism comprising a casing having an observation opening in its front wall, a carriage mounted to reciprocate laterally within the casing, a chart mount on the carriage movable laterally therewith and also movable with respect thereto toward and away from the opening, a plurality of charts mounted for independent movement on the chart mount, operating means on the casing in position to engage the charts as they are laterally reciprocated with the carriage and operative by said engagement to cause segregation of a chart from the others on the mount, and manual means for advancing and retracting the mount to bring the charts selectively into engaging relation to the operating means.

7. An optical chart mechanism comprising a casing having an observation opening in its front wall, a carriage mounted to reciprocate laterally within the casing, a chart mount on the carriage movable laterally therewith and also movable with respect thereto toward and away from the opening, and having a plurality of guide grooves therein extending in planes parallel with that of the opening, a plurality of charts slidably mounted in the guide grooves of the chart mount, the travel of the carriage being substantially the length of a chart, a push member on an end wall of the casing extending laterally substantially to the line of the adjacent edge of the observation opening and adapted to engage a chart and hold it in front of the observation opening as the carriage and other charts thereon are being moved toward the said end wall of the casing, and manual means for advancing and retracting the mount to bring the charts selectively into the plane of the push member.

8. An optical chart mechanism comprising a casing having an observation opening in its front wall, a carriage mounted to reciprocate laterally within the casing, a chart mount on the carriage movable laterally therewith and also movable with respect thereto toward and away from the opening and having a plurality of guide grooves therein extending in planes parallel with that of the opening, a plurality of charts slidably mounted in the guide grooves of the chart mount, the travel of the carriage being substantially the length of a chart, a push member on an end wall of the casing extending laterally substantially to the line of the adjacent edge of the observation opening and adapted to engage a chart and hold it in front of the observation opening as the carriage and other charts thereon are being moved toward the said end wall of the casing, a stop member extending across the path of the charts substantially in line with the opposite edge of the observation opening, and manual means for advancing and retracting the mount to bring the charts selectively into the plane of the push member.

9. An optical chart mechanism comprising a casing having an observation opening in its front wall, a carriage mounted to reciprocate laterally therein and having a recess extending normal to the plane of the opening, a chart mount thereon provided with a plurality of guide slots extending parallel to the plane of the opening and having on its underside an internally threaded nut extending into the recess of the carriage, a feed screw bearing in the end walls of the recess and engaging within the nut and serving to advance and retract the mount, the front end of the screw protruding through the front wall of the casing and the front wall being slotted to accommodate the movement of the protruding end as the carriage is reciprocated, a plurality of charts slidably mounted in the guide grooves of the chart mount, the travel of the carriage being substantially the length of a chart, and a push member on an end wall of the casing extending laterally substantially to the line of the adjacent edge of the observation opening, and adapted to engage a chart and hold it in front of the observation opening as the carriage and other charts thereon are being moved toward the said end wall of the casing.

10. An optical chart mechanism comprising a casing having an observation opening in its front wall, a carriage mounted to reciprocate laterally therein and having a recess extending normal to the plane of the opening, a chart mount thereon provided with a plurality of guide slots extending parallel to the plane of the opening and having on its underside an internally threaded nut extending into the recess of the carriage, a feed screw bearing in the end walls of the recess and engaging within the nut and serving to advance and retract the mount, the front end of the screw protruding through the front wall of the casing and the front wall being slotted to accommodate the movement of the protruding end as the carriage is reciprocated, a plurality of charts slidably mounted in the guide grooves of the chart mount, the travel of the carriage being substantially the length of a chart, a push member on an end wall of the casing extending laterally substantially to the line of the adjacent edge of the observation opening, and adapted to engage a chart and hold it in front of the observation opening as the carriage and other charts thereon are being moved toward the said end wall of the casing, a number disc on the front face of the casing, and actuating means for the number disc on the protruding end of the feed screw operative to actuate the number disc one step as the chart mount is being given a movement on the carriage substantially equal to the distance between the centers of two adjacent guide grooves.

11. Optical chart mechanism comprising a casing, a plurality of charts within said casing, means supporting said charts and enabling their individual movement thereon between limited positions within the casing, said means being also movable to cause movement of all of the charts which are free to move, and means for holding any selected chart from movement with the other charts upon movement of said supporting means, whereby said selected chart will be separated from the other charts, and all of said charts may be separated from the others in any desired sequence.

12. Optical chart mechanism comprising a support, a plurality of charts, a carriage movable on said support between limited positions and supporting said charts for limited movement thereon, whereby any of said charts may be segregated on said carriage from the others, and all charts moved with said carriage unless otherwise restricted, and selection means with respect to which said charts are relatively movable, for restricting movement of any selected chart with said carriage, whereby the charts may be segregated on said carriage individually for observation, in any selected order.

13. Optical chart mechanism comprising a group of charts, a carriage mounting said charts for individual limited movement in their planes, means supporting said carriage for movement to carry any selected chart into a desired observation plane, and also for movement parallel to that plane, and means for restricting movement of that chart which has been brought into the observation plane upon travel of the carriage in one direction parallel to said observation plane, whereby that chart will be segregated on said carriage from the other charts which move with the carriage.

14. Optical chart mechanism comprising a group of charts, means for supporting said charts and shifting the same as a group to place any selected chart in a desired position, and means for effecting segregation of such selected and positioned chart from the others, whereby said charts may be segregated individually from one another in any desired sequence.

In witness whereof I hereunto subscribe my signature.

GILBERT S. DEY.